UNITED STATES PATENT OFFICE.

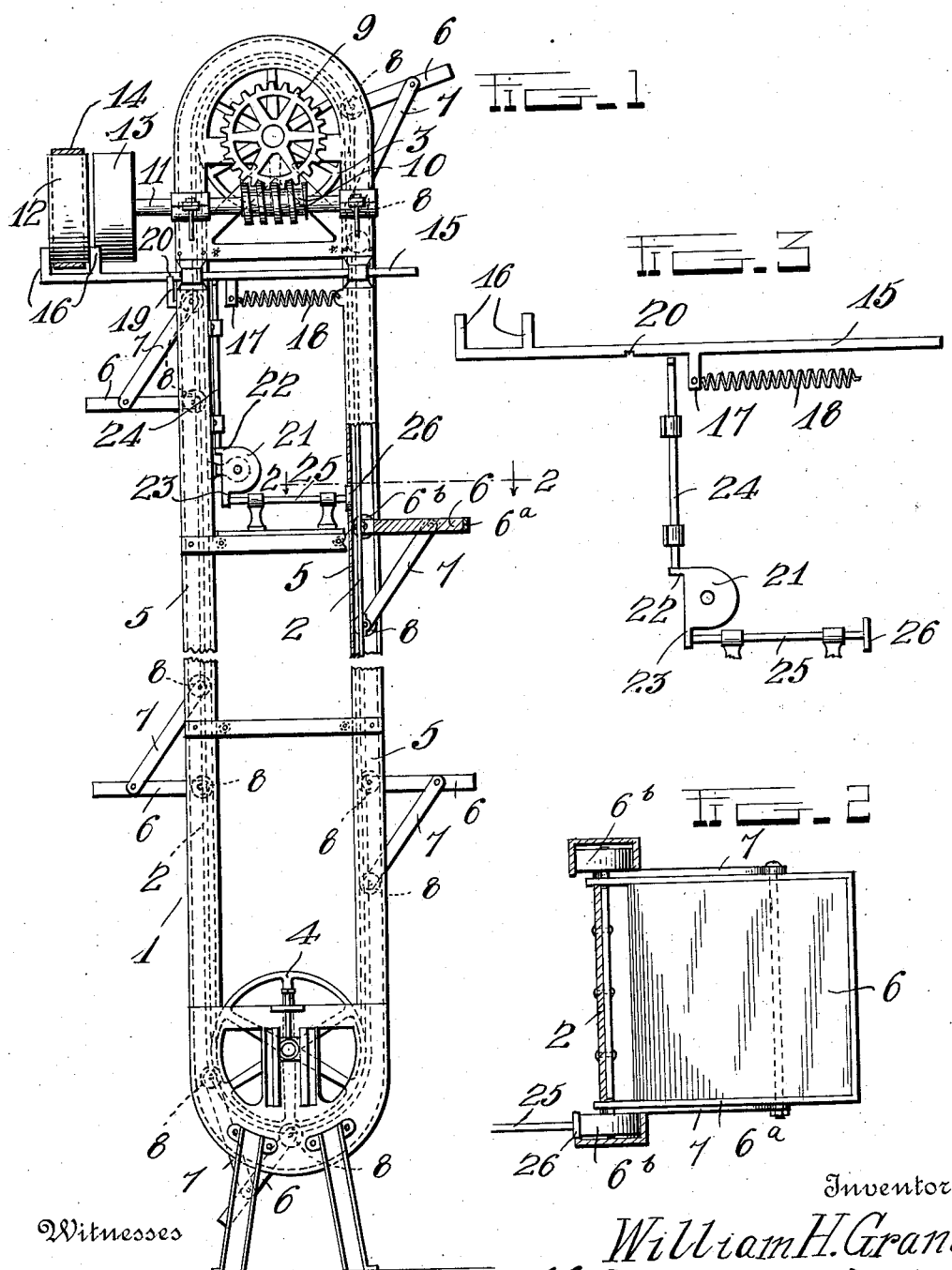

WILLIAM H. GRANT, OF HONEY CREEK, WISCONSIN.

SAFETY DEVICE FOR ELEVATORS.

1,028,454.  Specification of Letters Patent.  Patented June 4, 1912.

Application filed June 27, 1911. Serial No. 635,549.

*To all whom it may concern:*

Be it known that I, WILLIAM H. GRANT, a citizen of the United States, residing at Honey Creek, in the county of Walworth and State of Wisconsin, have invented certain new and useful Improvements in Safety Devices for Elevators; and I do declare the following to be a full, clear, and exact description of the invention, such as will enable others skilled in the art to which it appertains to make and use the same.

This invention relates to improvements in safety devices for elevators.

One object of the invention is to provide a safety device for passenger elevators adapted to be automatically operated by the weight of a passenger whereby the elevator will be stopped at such point as may be desired.

Another object is to provide a safety device of this character which will be simple, strong and durable in construction, efficient and reliable in operation and which may be applied to any form of endless belt or chain elevator.

With these and other objects in view, the invention consists of certain novel features of construction, and the combination and arrangement of parts as will be more fully described and claimed.

In the accompanying drawings: Figure 1 is a side elevation of an elevator having my improved safety device applied thereto; Fig. 2 is an enlarged horizontal sectional view on the line 2—2 of Fig. 1; Fig. 3 is a detail view of the device removed from the elevator.

Referring more particularly to the drawings, 1 denotes a passenger elevator of the endless belt type designed more especially for use in mills, factories and like places, for the use of the employees. The elevator comprises an endless belt 2 which runs over an upper drive pulley 3 and a lower guide pulley 4, said pulleys being mounted in suitable supporting frames as shown. The pulley supporting frames are connected by guide bars 5 shown as channel iron bars by means of which the steps or platforms 6 of the elevator are held in position and guided. The steps or platforms are secured to rectangular supporting frames $6^a$ which are suitably secured to the belt at proper intervals and are provided with supporting braces 7 as shown. On the inner sides of the step frames $6^a$ are revolubly mounted guide rollers $6^b$ and on the inner ends of the braces 7 are revolubly mounted guide rollers 8, said rollers engaging in the channels of the guide bars 5 and thereby guiding the steps in their upward and downward movement.

On the shaft of the upper drive pulley 3 is fixed a worm gear 9 with which is engaged a worm 10 on a drive shaft 11 journaled in suitable bearings on the upper pulley frame as shown. On one end of the shaft 11 is mounted a fixed pulley 12 and a loose pulley 13 with which is adapted to be engaged a main driving belt 14.

The parts described in the foregoing may be of any suitable construction.

My improved safety device comprises a belt shifting bar 15 which is slidably mounted in suitable supports on the guide bars 5. On one end of the bar 15 are formed right angular belt shifting fingers 16 which are engaged with the belt 14 and are adapted to shift the latter from one pulley to the other. On the bar 15 is formed a rigid depending arm 17 to which is attached one end of a coiled bar-operating spring 18 the opposite end of which is suitably secured to one of the guide bars 5 as shown. Secured to the opposite guide bar 5 is a stop plate 19 which is adapted to be engaged in a stop notch 20 formed in the lower edge of the shifting bar 15 whereby the latter is held in position of Fig. 1 against the pull of the spring 18.

Mounted in a suitable supporting bracket secured to one of the guide bars 5 is a cam trip plate or disk 21 which has formed thereon fingers 22 and 23 arranged at right angles to each other as shown. The lug 22 is adapted to engage the lower end of a vertically disposed rod 24 which is slidably supported in suitable guides secured to one of the bars 5 as shown.

Adapted to engage the lower finger 23 of the cam plate 21 is a slidably supported trip bar 25 the outer end of which is provided with a flat head or trip plate 26. The head 26 is arranged in an opening formed therefor in the inner side of one of the channel iron guide bars 5 as shown, the inner surface of the head 26 being flush with the inner surface of the channel iron guide bar with which the same is engaged, in which position the head will be in the path of movement of the rollers $6^b$ on the supporting frames $6^a$ of the steps 6 and the rollers 8 on the braces 7, on the side of the supporting frame in which said head 26 is arranged. When there is no weight on the steps or platforms the rollers 6ᵇ and 8 will pass freely over the head 26, but when weight is applied to the steps or platforms 6 by a person standing thereon, or a load placed thereon, the downward pressure of the weight on the braces 7 will cause the roller 8, on the braces in the guide bar in which the head 26 is seated to force said head and trip bar 25 inwardly against the finger 23, thus rocking the cam plate 21, which will cause the finger 22 thereon to actuate the releasing rod 24, thereby lifting the belt shifting rod 15 and disengaging the notch 20 therein from the stop plate 19, whereupon the spring 18 is permitted to retract said belt shifting bar 15, thereby shifting the belt from the tight pulley 12 to the loose pulley 13 and thus automatically stopping the elevator. Ordinarily the trip bar 25 and the opening in the guide bar to receive the head 26 will be so located that the roller 8 will pass the head as soon as the elevator shelf reaches and begins to pass above the top floor thereby preventing the person, or load, on the step being carried any higher.

A safety device constructed in accordance with my invention may be readily applied to elevators of the character described whereby the latter will be automatically and positively stopped at any height at which the safety device may be attached thus preventing any danger of the passengers being carried over the upper end of the elevator or beyond a predetermined point should they neglect to stop the elevator by the manually operated controlling mechanism thereof.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. In combination with a passenger elevator provided with a driving belt, a safety device comprising a belt shifting bar, a spring adapted to move the shifter to carry the driving belt of the elevator to an inoperative position, said bar having therein a notch, a stop plate adapted to engage said notch and thereby hold said bar in an operative position, a pivotally mounted trip plate, fingers projecting from said plate, a releasing rod engaged with said operating bar and adapted to be actuated by one of said fingers, a trip bar engaged with the other finger, and a trip plate on said bar adapted to be engaged by a moving part of the elevator whereby said trip bar is actuated and said cam and releasing bar operated to release said belt shifting bar to permit the spring to move the shifter to carry the driving belt from operative to inoperative position.

2. In an elevator comprising an endless belt, steps carried by said endless belt, braces for the steps also carried by the endless belt, a driving belt, and a shifting rod therefor, the combination therewith of a spring for actuating the shifter to move the driving belt to inoperative position, means for holding the shifter in position against the stress of the spring to maintain the driving belt in its operative position, and means whereby the holding means is released by the passage of the brace rollers to a predetermined height.

3. In an endless belt elevator comprising driving mechanism, a spring to normally hold it in inoperative position, means for holding the driving mechanism in operative position against the stress of the spring, steps carried by the elevator belt, braces for the steps engaging the elevator belt, and rollers on the inner ends of the steps and braces, the combination therewith of means actuated by the brace rollers of an occupied step at a predetermined point to release the holding means and permit the spring to shift the driving means to its inoperative position.

4. In an endless belt elevator, comprising a guide bar for the endless belt, having an opening at a predetermined point, a driving belt, fast and loose pulleys, a shifter, a spring normally holding the shifter in the loose pulley position, means for holding the shifter in the fast pulley position against the stress of the spring, a trip bar for the holding means projecting into the opening in the guide bar, steps carried by the elevator belt, braces on the steps engaging the elevator belt and rollers on the braces adapted, when the respective step is occupied and said roller is passing the opening in the guide bar, to disengage the trip bar.

In testimony whereof I have hereunto set my hand in presence of two subscribing witnesses.

WILLIAM H. GRANT.

Witnesses:
 Louis Kinnear,
 Joseph H. Harrison.

---

Copies of this patent may be obtained for five cents each, by addressing the "Commissioner of Patents, Washington, D. C."